(12) United States Patent
Ohno et al.

(10) Patent No.: US 7,981,496 B2
(45) Date of Patent: *Jul. 19, 2011

(54) HONEYCOMB STRUCTURED BODY

(75) Inventors: Kazushige Ohno, Gifu (JP); Masafumi Kunieda, Gifu (JP); Kazutake Ogyu, Gifu (JP)

(73) Assignee: Ibiden Co., Ltd, Gifu (JP)

( * ) Notice: Subject to any disclaimer, the term of this patent is extended or adjusted under 35 U.S.C. 154(b) by 497 days.

This patent is subject to a terminal disclaimer.

(21) Appl. No.: 11/298,833

(22) Filed: Dec. 12, 2005

(65) Prior Publication Data

US 2006/0292330 A1 Dec. 28, 2006

(30) Foreign Application Priority Data

Jun. 24, 2005 (JP) .................... PCT/JP2005/011664

(51) Int. Cl.
*B32B 3/12* (2006.01)
*B28B 1/30* (2006.01)

(52) U.S. Cl. ...................................... 428/116; 264/630

(58) Field of Classification Search ............... 502/439, 502/527; 428/116, 117, 119, 188, 327; 264/630; 501/118, 119, 120, 153, 154
See application file for complete search history.

(56) References Cited

U.S. PATENT DOCUMENTS

| | | | |
|---|---|---|---|
| 5,518,678 A * | 5/1996 | Miyamoto et al. ....... | 264/177.12 |
| 6,066,587 A | 5/2000 | Kurokawa et al. | |
| 6,149,877 A | 11/2000 | Ogai | |
| 6,159,578 A | 12/2000 | Ichikawa | |
| 6,669,751 B1 | 12/2003 | Ohno et al. | |
| 6,764,743 B2 | 7/2004 | Kato et al. | |
| 7,316,722 B2 * | 1/2008 | Komori et al. ................ | 55/523 |
| 2002/0197193 A1 * | 12/2002 | Harada et al. ................ | 422/177 |
| 2003/0170160 A1 * | 9/2003 | Morita et al. ................ | 423/247 |
| 2004/0014421 A1 * | 1/2004 | Raymer ....................... | 454/271 |
| 2004/0045267 A1 | 3/2004 | Ichikawa et al. | |
| 2004/0170803 A1 * | 9/2004 | Ichikawa ..................... | 428/116 |
| 2005/0025933 A1 | 2/2005 | Masukawa et al. | |
| 2005/0079975 A1 * | 4/2005 | Fujita ........................... | 502/439 |
| 2005/0109023 A1 | 5/2005 | Kudo et al. | |
| 2005/0227869 A1 | 10/2005 | Ohno et al. | |

(Continued)

FOREIGN PATENT DOCUMENTS

DE  43 41 159 A1  6/1995

(Continued)

OTHER PUBLICATIONS

JP Matsumoto translation.*

(Continued)

*Primary Examiner* — Jennifer C McNeil
*Assistant Examiner* — Lauren Robinson
(74) *Attorney, Agent, or Firm* — Finnegan, Henderson, Farabow, Garrett & Dunner, LLP

(57) ABSTRACT

A honeycomb structured body of the present invention includes plural pillar-shaped honeycomb units which are bonded to one another through sealing material layers, each unit having in the longitudinal direction a large number of cells placed in parallel with a cell wall therebetween, wherein each honeycomb unit includes inorganic fibers and/or whiskers in addition to inorganic particles, a cross-sectional area of the honeycomb unit on a cross section perpendicular to the longitudinal direction is set to at least about 5 cm² and at most about 50 cm², and a coefficient $\alpha_L$ of thermal expansion of the sealing material layer and a coefficient $\alpha_F$ of thermal expansion of the honeycomb unit satisfy the following relationship:

about $0.01 \leq |\alpha_L - \alpha_F|/\alpha_F \leq$ about $1.0$.

23 Claims, 6 Drawing Sheets

U.S. PATENT DOCUMENTS

| | | | |
|---|---|---|---|
| 2005/0247038 A1 | 11/2005 | Takahashi | |
| 2005/0255288 A1* | 11/2005 | Noguchi et al. | 428/116 |
| 2005/0266992 A1 | 12/2005 | Ohno et al. | |
| 2005/0272602 A1* | 12/2005 | Ninomiya | 502/439 |
| 2006/0172113 A1 | 8/2006 | Kunieda | |
| 2006/0177629 A1 | 8/2006 | Kunieda | |
| 2006/0263574 A1 | 11/2006 | Tsunekawa et al. | |
| 2006/0292044 A1 | 12/2006 | Ohno et al. | |
| 2006/0292330 A1 | 12/2006 | Ohno et al. | |
| 2006/0292331 A1 | 12/2006 | Ohno et al. | |
| 2006/0292332 A1 | 12/2006 | Ohno et al. | |
| 2006/0292333 A1 | 12/2006 | Ohno et al. | |
| 2006/0292334 A1 | 12/2006 | Ohno et al. | |
| 2006/0292335 A1 | 12/2006 | Ohno et al. | |
| 2006/0292336 A1 | 12/2006 | Ohno et al. | |
| 2006/0292337 A1 | 12/2006 | Ohno et al. | |
| 2006/0292338 A1 | 12/2006 | Ohno et al. | |
| 2006/0292339 A1 | 12/2006 | Ohno et al. | |
| 2006/0292340 A1 | 12/2006 | Ohno et al. | |
| 2006/0292341 A1 | 12/2006 | Ohno et al. | |
| 2006/0292342 A1 | 12/2006 | Ohno et al. | |
| 2006/0292393 A1 | 12/2006 | Kunieda | |
| 2007/0004592 A1 | 1/2007 | Ohno et al. | |
| 2007/0004593 A1 | 1/2007 | Ohno et al. | |
| 2007/0039295 A1 | 2/2007 | Ohno | |
| 2007/0077190 A1 | 4/2007 | Ohno | |
| 2008/0118682 A1 | 5/2008 | Ido | |
| 2008/0118701 A1 | 5/2008 | Ohno et al. | |
| 2008/0119355 A1 | 5/2008 | Ohno et al. | |
| 2008/0176028 A1 | 7/2008 | Ohno et al. | |
| 2008/0187713 A1 | 8/2008 | Ohno et al. | |
| 2008/0241003 A1 | 10/2008 | Ido et al. | |
| 2008/0241005 A1 | 10/2008 | Ido et al. | |
| 2008/0241008 A1 | 10/2008 | Ido et al. | |
| 2008/0260991 A1 | 10/2008 | Konstandopoulos et al. | |

FOREIGN PATENT DOCUMENTS

| | | | |
|---|---|---|---|
| EP | 1 142 619 A1 | | 10/2001 |
| EP | 1 249 262 A1 | | 10/2002 |
| EP | 1 384 508 A1 | | 1/2004 |
| EP | 1 447 535 A1 | | 8/2004 |
| EP | 1 479 881 A1 | | 11/2004 |
| EP | 1 479 882 A1 | | 11/2004 |
| EP | 1 674 147 A1 | | 6/2006 |
| JP | 02-208263 | * | 8/1990 |
| JP | 5-213681 | | 8/1993 |
| JP | 08-012460 A | | 1/1996 |
| JP | 8-028246 | | 1/1996 |
| JP | 10-263416 | | 10/1998 |
| JP | 2000-102709 A | | 4/2000 |
| JP | 2001-096116 A | | 4/2001 |
| JP | 2001-097777 A | | 4/2001 |
| JP | 2001-190916 | | 7/2001 |
| JP | 2001-329836 A | | 11/2001 |
| JP | 2002-320807 | * | 11/2002 |
| JP | 2002-326034 A | | 11/2002 |
| JP | 2003-155908 A | | 5/2003 |
| JP | 2004-001365 A | | 1/2004 |
| JP | 2004-051384 A | | 2/2004 |
| WO | WO 03/067041 A1 | | 8/2003 |
| WO | WO-2003-091182 | * | 11/2003 |
| WO | WO-2003091182 | * | 11/2003 |
| WO | WO-2004024295 | * | 3/2004 |
| WO | WO 2005/063653 A1 | | 7/2004 |
| WO | WO 2005/075075 A1 | | 8/2005 |

OTHER PUBLICATIONS

JP Matsumoto abstract translation.*
Wipo Noguchi translation.*
Wipo Noguchi trans bib.*
Mitsui Patent abstract translation.*
International Preliminary Report on Patentability, dated Dec. 24, 2007 on International Application No. PCT/JP20005/011664 (4 pgs.).
U.S. Appl. No. 12/194,888.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
First Notification of Office Action issued by the State Intellectual Property Office of the People's Republic of China, dated Jun. 12, 2009, for Chinese application No. 200610072370.1, and English language translation thereof.
Presentation entitled "Saint-Gobain Norpro Catalytic Products" and English language translation thereof.
English language Derwent Abstract of XP-002375248.
Kamino et al., *Colloidal Processing for Preparation and Mechanical Properties of Si-C-O Long Fiber/Alumina Matrix Composite*, Reports of Kagoshima Prefectural Institute of Industrial Technology, No. 8 (1994).
Osaki, *Development of a Catalyst for Purification of Exhaust Gas*, Advanced Industrial Science and Technology (AIST) Today, vol. 6, No. 11, 18-19 (2006).
U.S. Appl. No. 11/853,658, Takahiko Ido.
U.S. Appl. No. 11/928,546, Kazushige Ohno, etc.

* cited by examiner

HONEYCOMB STRUCTURED BODY

CROSS-REFERENCE TO RELATED APPLICATIONS

This application claims benefit of priority based on PCT/JP2005/011664 filed on Jun. 24, 2005. The contents of this application are incorporated herein by reference in their entirety.

BACKGROUND OF THE INVENTION

1. Field of the Invention

The present invention relates to a honeycomb structured body.

2. Discussion of the Background

Conventionally, a honeycomb catalyst generally used for exhaust gas conversion of an automobile is manufactured by supporting a high specific surface area material such as active alumina and the like and a catalyst metal such as platinum and the like on a surface of a cordierite-based honeycomb structured body that has an integral structure and a low thermal expansion property. Moreover, an alkaline earth metal such as Ba and the like is supported thereon as a NOx occlusion agent, so as to be used for treating NOx in an atmosphere with excessive oxygen such as an atmosphere in a lean burn engine and a diesel engine.

Here, in order to improve the converting performance, it is necessary to increase the possibility of contact between exhaust gases and the catalyst noble metal as well as the NOx occlusion agent. For this purpose, it is necessary for the support to have a higher specific surface area and for the noble metal to have a smaller grain size and to be dispersed in a high level. Therefore, there are suggested various honeycomb structured bodies in which the cell shape, the cell density, the thickness of cell walls, and the like have been devised (for example, see JP-A 10-263416).

With respect to the honeycomb structured body made of a high specific surface area material, a honeycomb structured body that has been subjected to extrusion molding together with inorganic fibers and an inorganic binder has been known (for example, see JP-A 5-213681). Moreover, in order to allow such a honeycomb structured body to have a large size, a structure in which honeycomb units are jointed to one another by an adhesion layer has been known (for example, see DE 4341159).

Moreover, there is also known such case disclosed in JP-A 10-263416 in which a high specific surface area material such as active alumina and the like and a catalyst metal such as platinum and the like are supported on the surface of a cordierite-based honeycomb structured body.

There is also known a honeycomb structured body disclosed in JP-A 5-213681 in which the high specific surface material is subjected to extrusion molding together with inorganic fibers and an inorganic binder, Moreover, a honeycomb structured body formed by bonding plural honeycomb units to one another through adhesive layers has also been disclosed, for example, in JP-A 8-28246, JP-A 2001-190916 and the like.

The contents of JP-A 10-263416, JP-A 5-213681, DE 4341159, JP-A 8-28246, and JP-A 2001-190916 are incorporated herein by reference in their entirety.

SUMMARY OF THE INVENTION

A honeycomb structured body of the present invention is a honeycomb structured body in which a ceramic block with plural pillar-shaped honeycomb units are bonded to one another through sealing material layers, each unit having in the longitudinal direction a large number of cells placed in parallel with a cell wall therebetween, wherein each of the honeycomb unit includes inorganic fibers and/or whiskers in addition to inorganic particles, a cross-sectional area of the honeycomb unit on a cross section perpendicular to the longitudinal direction is at least about 5 cm$^2$ and at most about 50 cm$^2$, and a coefficient $\alpha_L$ of thermal expansion of the sealing material layer and a coefficient $\alpha_F$ of thermal expansion of the honeycomb unit have the following relationship:

$$\text{about } 0.01 \leq |\alpha_L - \alpha_F|/\alpha_F \leq \text{about } 1.0.$$

In the above-mentioned honeycomb structured body, it is desirable that the total sum of cross-sectional areas of the honeycomb units on the cross section perpendicular to the longitudinal direction accounts for about 85% or more, more desirably for about 90% or more of the cross-sectional area of the honeycomb structured body on the cross section perpendicular to the longitudinal direction.

In the above-mentioned honeycomb structured body, it is desirable that a coating material layer is formed on the outermost periphery, and a coefficient $\alpha_M$ of thermal expansion of the coating material layer and the coefficient $\alpha_F$ of thermal expansion of the honeycomb unit have the following relationship:

$$\text{about } 0.01 \leq |\alpha_M - \alpha_F|/\alpha_F \leq \text{about } 1.0.$$

In the above-mentioned honeycomb structured body, it is desirable that the inorganic particles comprise of at least one member selected from the group consisting of alumina, silica, zirconia, titania, ceria, mullite and zeolite. The amount of the inorganic particle contained in the honeycomb unit is desirable to be at least about 30% by weight and at most about 97% by weight, more desirable to be at least about 40% by weight and at most about 90% by weight, and further desirable to be at least about 50% by weight and at most about 80% by weight.

In the above-mentioned honeycomb structured body, it is desirable that the inorganic fibers and/or whiskers comprise of at least one member selected from the group consisting of alumina, silica, silicon carbide, silica-alumina, glass, potassium titanate and aluminum borate. The aspect ratio (length/diameter) of the inorganic fibers and/or whiskers is desirable to be at least about 2 and at most about 1000, more desirable to be at least about 5 and at most about 800, and further desirable to be at least about 10 and at most about 500. The total amount of the inorganic fibers and/or whiskers contained in the honeycomb unit is desirable to be at least about 3% by weight and at most about 70% by weight, more desirable to be at least about 5% by weight and at most about 50% by weight, and further desirable to be at least about 8% by weight and at most about 40% by weight.

Furthermore, it is desirable that the honeycomb unit contains an inorganic binder. The amount of the inorganic binder as solid component of a raw material paste is desirable to be at least about 5% by weight and at most about 50% by weight, more desirable to be at least about 10% by weight and at most about 40% by weight, and further desirable to be at least about 15% by weight and at most about 35% by weight.

In the above-mentioned honeycomb structured body, it is desirable that the inorganic binder comprises of at least one member selected from the group consisting of alumina sol, silica sol, titania sol, water glass, sepiolite and attapulgite.

On the honeycomb structured body, it is desirable that a catalyst is supported, and that the catalyst contains at least one member selected from the group consisting of noble metal, alkali metal, alkaline earth metal and oxide.

Moreover, it is desirable that the above-mentioned honeycomb structured body is used for exhaust gas conversion of a vehicle.

DESCRIPTION OF THE EMBODIMENTS

Figure 1A:
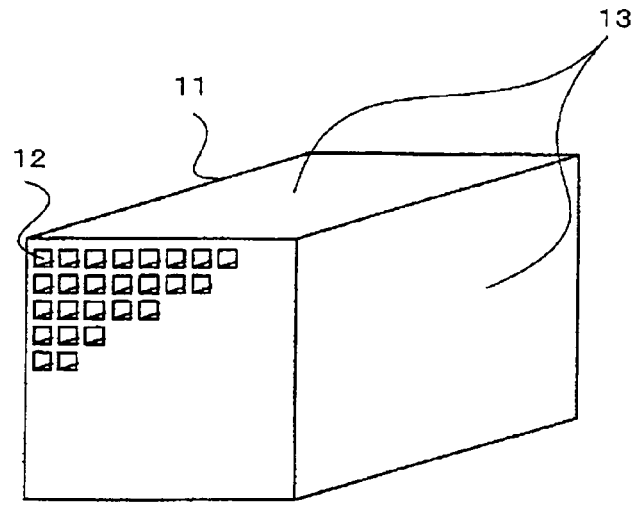
FIG. 1A is a perspective view that schematically shows one example of a honeycomb unit constituting a honeycomb structured body of the present invention.

By making reference to the drawings, description for the honeycomb structured body of the present invention will be given hereafter.

The honeycomb structured body of the present invention is a honeycomb structured body in which plural pillar-shaped honeycomb units are bonded to one another through sealing material layers, each unit having in the longitudinal direction a large number of cells placed in parallel with a cell wall therebetween, wherein each of the honeycomb unit includes inorganic fibers and/or whiskers in addition to inorganic particles, a cross-sectional area of the honeycomb unit on a cross section perpendicular to the longitudinal direction is at least about 5 cm² and at most about 50 cm², and a coefficient $\alpha_L$ of thermal expansion of the sealing material layer and a coefficient $\alpha_F$ of thermal expansion of the honeycomb unit have the following relationship:

about $0.01 \leq |\alpha_L - \alpha_F|/\alpha_F \leq$ about $1.0$.

The honeycomb structured body of the present invention can alleviate a thermal stress generated due to a local temperature change in the honeycomb structured body, is resistant to thermal shock and vibration, is excellent in durability, and in addition, can disperse catalyst components in a high level.

The honeycomb structured body of the present invention can be especially used conveniently as a catalytic converter.

Since plural honeycomb units are bonded to one another through sealing material layers, the honeycomb structured body of the present invention is resistant to thermal shock and vibration. The reason for this is presumably because, even when a temperature distribution is formed in the honeycomb structured body due to an abrupt temperature change and the like, the difference of temperature per honeycomb unit can be reduced to a small level, or presumably because thermal shock and vibration can be alleviated by the sealing material layers. Moreover, even when a crack occurs in the honeycomb unit due to a thermal stress and the like, the sealing material layers can prevent the crack from expanding over the entire honeycomb structured body, serve as frames of the honeycomb structured body, and maintain a proper shape of the honeycomb structured body, to maintain the function of the honeycomb structured body as a catalyst support.

Here, the cross-sectional area of the honeycomb unit on a cross section perpendicular to the longitudinal direction of the honeycomb structured body (hereinafter, referred to simply as cross-sectional area) is about 5 cm² in lower limit and about 50 cm² in upper limit. When the cross-sectional area is less than about 5 cm², the cross-sectional area of the sealing material layers that bond the honeycomb units to one another becomes greater, thereby making the specific surface area on which a catalyst is supported relatively small, while a pressure loss is made to be relatively great. On the other hand, when the cross-sectional area exceeds about 50 cm², the size of the unit becomes too large, making it difficult to sufficiently suppress the thermal stress generated in each honeycomb unit.

On the other hand, when the cross-sectional area of the honeycomb unit is in the range of at least about 5 cm² and at most about 50 cm², the ratio of the sealing material layers in the honeycomb structured body can be adjusted, and thus the specific surface area can be maintained at a high level, making it possible to disperse catalyst components in a high level.

Moreover, even when external forces such as thermal shock and vibration are applied thereto, the shape as the honeycomb structured body can be maintained, and a pressure loss can be suppressed to a low level.

Therefore, according to this honeycomb structured body, the catalyst components can be dispersed in a high level and the strength against thermal shock and vibration can be enhanced.

Here, the specific surface area per unit volume can be calculated by the after-mentioned expression (1).

Moreover, when the honeycomb structured body includes plural honeycomb units which have different cross-sectional areas, the cross-sectional area of the honeycomb unit refers to a cross-sectional area of the honeycomb unit that serves as a basic unit constituting the honeycomb structured body, which normally indicates the honeycomb unit having the largest cross-sectional area.

It is desirable that the lower limit of the cross-sectional area is about 6 cm², and more desirably about 8 cm². In contrast, it is desirable that the upper limit of the cross-sectional area is about 40 cm², and more desirably about 30 cm².

Furthermore, in the above-mentioned honeycomb structured body, the relational expression $|\alpha_L - \alpha_F|/\alpha_F$ between the coefficient $\alpha_L$ of thermal expansion of the sealing material layer and the coefficient $\alpha_F$ of thermal expansion of the honeycomb unit is about 0.01 or more in lower limit, and about 1.0 or less in upper limit. Here, the values of each of the coefficient of thermal expansions in the relational expression were obtained through measurements at 800° C.

The reason why the measurements are carried out at 800° C. is because the temperature around 800° C. is considered to be the nearest temperature in maximum at which the honeycomb structured body is to be subjected.

In other words, the coefficient of thermal expansion of the sealing material layers constituting the honeycomb structured body of the present invention and the coefficient of thermal expansion of the honeycomb unit are not the same, and are slightly different from each other. Therefore, in the above-mentioned honeycomb structured body, even when local burning, that is, a local temperature change occurs due to unevenness in the amount of catalyst upon supporting the catalyst, and unevenness in the heating caused by exhaust gases and the like, and unevenness of the like, it is possible to suitably alleviate a local thermal stress that is exerted between the portion having the local temperature change and portions other than this portion, and thus cracks in the honeycomb unit and the adhesive layer do not occur, thereby providing the honeycomb structured body superior in durability.

When the value of the above-mentioned relational expression, $|\alpha_L - \alpha_F|/\alpha_F$, is less than about 0.01, the coefficient of thermal expansion of the sealing material layers and the coefficient of thermal expansion of the honeycomb unit become almost the same, failing to sufficiently alleviate a local thermal stress that occurs due to unevenness in the amount of catalyst upon supporting the catalyst and unevenness in the heating caused by exhaust gases and the like, and unevenness of the like, and thus, cracks in the honeycomb unit and the sealing material layer tend to occur, sometimes leading to destruction of the honeycomb structured body.

On the other hand, when the value of the above-mentioned relational expression, $|\alpha_L - \alpha_F|/\alpha_F$, more than about 1.0, a difference becomes too large between the thermal expansion of the sealing material layer and the thermal expansion of the honeycomb unit caused by a difference of temperature in exhaust gases during normal use of the honeycomb structured body, thereby making cracks in the honeycomb unit and the sealing material layer occur here as well, sometimes destroying the honeycomb structured body.

Here, $\alpha_L - \alpha_F$, indicating the difference between the coefficient $\alpha_L$ of thermal expansion of the sealing material layer and the coefficient $\alpha_F$ of thermal expansion of the honeycomb unit, is represented by the absolute value because the coefficient $\alpha_F$ of thermal expansion of the honeycomb unit may be made greater than the coefficient $\alpha_L$ of thermal expansion of the sealing material layer.

In the above-mentioned honeycomb structured body, it is desirable that the total sum of cross-sectional areas of the honeycomb units accounts for about 85% or more, more desirably for about 90% or more of the cross-sectional area of the honeycomb structured body on the cross section perpendicular to the longitudinal direction.

When the total sum of cross-sectional areas of the honeycomb units accounts for about 85% or more, as the cross-sectional areas of the sealing material layers become small, and the total cross-sectional areas of the honeycomb units become large, the specific surface area used for supporting the catalyst becomes relatively large, while the pressure loss can be controlled to a relatively small value.

When the ratio is about 90% or more, the pressure loss can be made smaller.

In the above-mentioned honeycomb structured body, it is desirable that a coating material layer is formed on the outermost periphery.

The peripheral face can be protected thereby, and the strength can be improved.

When the coating material layer is formed, it is desirable that the relational expression between the coefficient $\alpha_M$ of thermal expansion of the coating material layer and the coefficient $\alpha_F$ of thermal expansion of the honeycomb unit, $|\alpha_M - \alpha_F|/\alpha_F$, is about 0.01 or more in lower limit, and is about 1.0 or less in upper limit.

Here, the values of the respective coefficient of thermal expansions in the above-mentioned relational expression were measured at 800° C.

The reason why the measurements are carried out at 800° C. is because the temperature around 800° C. is considered to be the nearest temperature in maximum at which the honeycomb structured body is exposed.

When the relational expression $|\alpha_M - \alpha_F|/\alpha_F$, of the coefficient of thermal expansion of the coating material layer is about 0.01 or more and about 1.0 or less, a local thermal stress generated when local burning occurs at the honeycomb structured body due to unevenness in the amount of catalyst upon supporting the catalyst and unevenness in the heating caused by exhaust gases and the like, and of the like unevenness can be alleviated, and thus, it can be prevented from cracks to occur in the honeycomb unit and the coating material layer which lead to destruction of the honeycomb structured body.

Here, $\alpha_M - \alpha_F$, indicating the difference between the coefficient $\alpha_M$ of thermal expansion of the coating material layer and the coefficient $\alpha_F$ of thermal expansion of the honeycomb unit, is represented by the absolute value because the coefficient $\alpha_F$ of thermal expansion of the honeycomb unit may be made greater than the coefficient $\alpha_M$ of thermal expansion of the coating material layer.

Moreover, as will be described later, the honeycomb structured body of the present invention may have a catalyst supported thereon. In this case, the coefficient of thermal expansion of the sealing material layer after the catalyst has been supported thereon is defined as $\alpha_L$; the coefficient of thermal expansion of the honeycomb unit after the catalyst has been supported thereon is defined as $\alpha_F$; and the coefficient of thermal expansion of the coating material layer after the catalyst has been supported thereon is defined as $\alpha_M$.

The shape of a honeycomb structured body formed by bonding plural honeycomb units to one another is not particularly limited, and may include, for example, a cylindrical shape, a rectangular pillar shape, an elliptic cylinder shape and the like. Moreover, the size thereof is not particularly limited.

The honeycomb units that constitute the honeycomb structured body of the present invention include inorganic fibers and/or whiskers in addition to inorganic particles.

Accordingly, the specific surface area is improved by the inorganic particles, and the strength of the porous ceramic is improved by the inorganic fibers and/or whiskers.

As the inorganic particles, it is desirable that particles made of alumina, silica, zirconia, titania, ceria, mullite, zeolite, and the like are used. These particles may be used independently, or two or more kinds thereof may be used in combination. Among these, it is especially desirable to use alumina particles.

As the inorganic fibers and whiskers, it is desirable that inorganic fibers and whiskers made of alumina, silica, silicon carbide, silica-alumina, glass, potassium titanate, aluminum borate and the like are used. These may be used independently, or two or more kinds thereof may be used in combination.

The aspect ratio (length/diameter) of the above-mentioned inorganic fibers and whiskers is about 2, more desirably about 5, most desirably about 10 in lower limit, and about 1000, more desirably about 800, most desirably about 500 in upper limit.

Here, when there is a distribution in the aspect ratio, the aspect ratio of the inorganic fibers and whiskers is indicated by the average value thereof.

It is desirable that the amount of the inorganic particles contained in the honeycomb unit is about 30% by weight, more desirably about 40% by weight, most desirably about 50% by weight in lower limit.

In contrast, it is desirable that the upper limit thereof is about 97% by weight, more desirably about 90% by weight, most desirably about 80% by weight, and especially desirable when about 75% by weight.

When the content of the inorganic particles is in the range of about 30% by weight to about 97% by weight, the amount of inorganic particles that devote to improvements of the specific surface area becomes relatively large, making the specific surface area of the honeycomb structured body to become large, enabling a catalyst component to disperse in a high level upon supporting the catalyst component. Moreover, the amount of the inorganic fibers and/or whiskers that devote to improvements in strength can be controlled not to become relatively small, and it can further be prevented from the strength of the honeycomb structured body to be reduced.

It is desirable that the total amount of the inorganic fibers and/or whiskers contained in the honeycomb unit is about 3% by weight, more desirably about 5% by weight, most desirably about 8% by weight in lower limit, and that the upper limit thereof is about 70% by weight, more desirably about 50% by weight, most desirably about 40% by weight, and especially desirable when about 30% by weight.

When the total amount of the inorganic fibers and/or whiskers is in the range of about 3% by weight to about 70% by weight, the strength of the honeycomb structured body can be maintained, and the amount of inorganic particles that devote to improvements of the specific surface area can be made relatively large, making the specific surface area of the honeycomb structured body large, enabling a catalyst component to disperse in a high level upon supporting the catalyst component.

Moreover, it is desirable that the honeycomb unit is manufactured by using a mixture containing the inorganic particles, the inorganic fibers and/or whiskers and an inorganic binder.

By thus using a mixture containing the inorganic binder, a honeycomb unit that has sufficient strength can be obtained even when the temperature at which a raw molded body is fired is set to a low level.

As the inorganic binder, an inorganic sol, a clay-type binder and the like can be used, and specific examples of the inorganic sol include, for example, alumina sol, silica sol, titania sol, water glass and the like. Moreover, examples of the clay-type binder include, for example, clays having a double-chain structure, such as clay, kaolin, montmorillonite, sepiolite, attapulgite and the like, and clays of the like. These may be used independently, or two or more kinds thereof may be used in combination.

Among these, it is desirable therefor to comprise of at least one kind selected from the group consisting of alumina sol, silica sol, titania sol, water glass, sepiolite and attapulgite is used.

It is desirable that the amount of the inorganic binder that serves as a solid component of a raw material paste prepared in a manufacturing process which will be described later is about 5% by weight, more desirably about 10% by weight, most desirably about 15% by weight in lower limit, and that the upper limit thereof is about 50% by weight, more desirably about 40% by weight, most desirably about 35% by weight.

When the content of the inorganic binder is about 50% by weight or less, sufficient moldability can be maintained.

Although the shape of the honeycomb unit is not particularly limited, it is preferable to be designed such that the honeycomb units are easily bonded to one another, and examples of the shape of a cross section perpendicular to the longitudinal direction (hereinafter, referred to simply as "cross section") include a square shape, a rectangular shape, a hexagonal shape, a sector shape and the like.

A honeycomb unit having a rectangular parallelepiped shape with a square shape on its cross section is shown in the drawings as one example of the honeycomb unit.

Figure 1B:
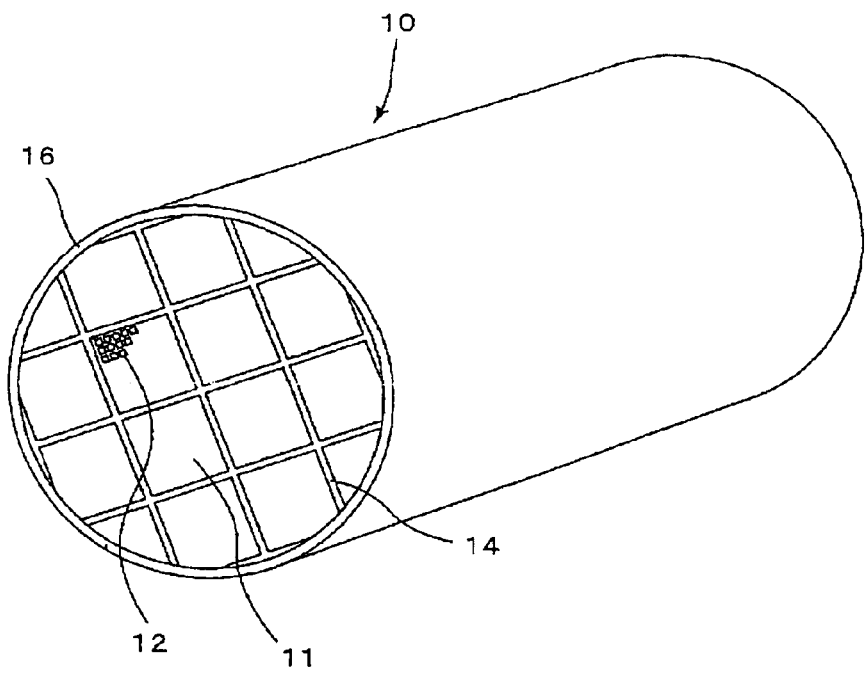
FIG. 1B is a perspective view that schematically shows one example of a honeycomb structured body of the present invention.

FIG. 1A is a perspective view that schematically shows one example of the honeycomb unit that constitutes the honeycomb structured body of the present invention, and FIG. 1B is a perspective view that schematically shows one example of the honeycomb structured body of the present invention.

A honeycomb unit 11 has, from the front side toward the backside, a large number of cells 12, and an outer face 13 without any cells 12.

Although the thickness between the cells 12 (thickness of a cell wall) is not particularly limited, it is desirable to be about 0.05 mm, more desirably about 0.10 mm, most desirably about 0.15 mm in lower limit. In contrast, it is desirable that the upper limit thereof is about 0.35 mm, more desirably about 0.30 mm, most desirably about 0.25 mm.

When the thickness of the cell wall is at least about 0.05 mm, and at most about 0.35 mm, the reduction in strength of the honeycomb unit can be controlled, and since there is an increase in contact area with exhaust gases which leads to gases penetrating deeply enough, contact frequency between the catalyst supported on the inside of the cell wall and gases is enhanced, thereby improving the catalyst performances.

It is desirable that the cell density of the honeycomb unit is about 15.5 cells/cm$^2$ (about 100 cpsi), more desirably about 46.5 cells/cm$^2$ (about 300 cpsi), most desirably about 62.0 cells/cm$^2$ (about 400 cpsi), in lower limit. In contrast, it is desirable that the upper limit of the cell density is about 186 cells/cm$^2$ (about 1200 cpsi), more desirably about 170.5 cells/cm$^2$ (about 1100 cpsi), most desirably about 155 cells/cm$^2$ (about 1000 cpsi).

When the cell density is at least about 15.5 cells/cm$^2$ and at most about 186 cells/cm$^2$, the wall area inside the honeycomb unit that contacts with exhaust gases can be made to become large. Furthermore, the pressure loss can be controlled, to make the honeycomb unit fabricated easily.

The cross-sectional shape of cells formed in the honeycomb unit is not particularly limited, and may be formed into an almost triangular shape or an almost hexagonal shape, in addition to a square shape as shown in FIG. 1A.

Hereinafter, explanation for a manufacturing method of the honeycomb structured body of the present invention will be given in the order of processes.

First, a molded body is fabricated through extrusion molding and the like, by using a raw material paste mainly composed of the inorganic fibers and/or whiskers in addition to the inorganic particles.

In addition to these, according to need, and depending on the required moldability the inorganic binder, an organic binder, a dispersant and a molding assistant may be added to the raw material paste in an appropriate manner.

Although examples of the organic binder are not particularly limited, they may include, for example, methyl cellulose, carboxymethyl cellulose, hydroxyethyl cellulose, polyethylene glycol, phenol resins, epoxy resins and the like.

These may be used independently, or two or more kinds thereof may be used in combination.

It is preferable that the blending quantity of the organic binder is in the range of 1 to 10 parts by weight out of 100 parts by weight of a total of the inorganic particles, the inorganic fibers, the whiskers and the inorganic binder.

Although examples of the dispersant are not particularly limited, they may include, for example, water, an organic solvent (such as benzene), alcohol (such as methanol) and the like.

Although examples of the above-mentioned molding assistant are not particularly limited, they may include, for example, ethylene glycol, dextrin, fatty acid, fatty acid soap, polyalcohol and the like.

Although not particularly limited, it is preferable that mixing and kneading processes are carried out upon preparing the raw material paste, and for example, the mixing process may be carried out by using a mixer, an attritor and the like, and the kneading process may sufficiently be carried out by using a kneader and the like.

Although the method for molding the raw material paste is not particularly limited, it is preferable that the extrusion-molding process as mentioned above and processes of the like are carried out so that the resulting molded body is molded into a shape with cells formed therein.

Next, according to need, a dried body is obtained by drying the resulting molded body, using a dryer.

Examples of the dryer include a microwave dryer, a hot-air dryer, a dielectric dryer, a reduced-pressure dryer, a vacuum dryer, a freeze dryer and the like.

Next, according to need, the resulting dried body is subjected to a degreasing process.

The degreasing conditions are not particularly limited, and are appropriately determined depending on the kinds and amounts of organic substances contained in the molded body, but it is desirable therefor to be at about 400° C. for about 2 hours.

Next, according to need, the molded body which has been subjected to the drying and degreasing processes, is fired.

Although the firing condition is not particularly limited, it is desirable to be at least about 600° C. and at most about 1200° C., more desirably at least about 600° C. and at most about 1000° C.

The reason for this is because, when the firing temperature is at least about 600° C. and at most about 1200° C., ceramic particles and the like can be prevented from being sintered too much, while the sintering of ceramic particles and the like progress sufficiently, enabling the strength of the honeycomb structured body to improve, and furthermore, the specific surface area per unit volume can be made to become large and the catalyst component to be supported can be dispersed sufficiently in a high level.

By using these processes, a pillar-shaped honeycomb unit in which a number of cells are placed in parallel in the longitudinal direction with a cell wall therebetween can be manufactured.

Here, the coefficient $\alpha_F$ of thermal expansion of the honeycomb unit is determined by the materials contained in the mixed composition and the firing conditions thereof.

Next, a sealing material paste to be used as a sealing material layer is applied to the resulting honeycomb units, so that the honeycomb units are successively bonded to one another. Then, these are dried and secured to manufacture a honeycomb unit united body of a predetermined size in which the honeycomb units are bonded to one another through the sealing material layers.

Although examples of the above-mentioned sealing material paste are not particularly limited, they may include, for example, a paste formed by mixing an inorganic binder and ceramic particles, a paste formed by mixing an inorganic binder and inorganic fibers, a paste formed by mixing an inorganic binder, ceramic particles and inorganic fibers, and pastes of the like.

Moreover, an organic binder may be added to these sealing material pastes.

Although examples of the organic binder are not particularly limited, they may include, for example, polyvinyl alcohol, methyl cellulose, ethyl cellulose, carboxymethyl cellulose and the like.

These may be used independently, or two or more kinds thereof may be used in combination.

It is desirable that the sealing material layer is at least about 0.5 and at most about 2 mm in thickness.

When the thickness of the sealing material layer is at least about 0.5 mm and at most about 2 mm, a joining strength can be enhanced sufficiently, and concerning the fact that the sealing material layer is a portion that does not function as a catalyst support, the specific surface area per unit volume of the honeycomb structured body can be made to become large, making a catalyst component to disperse sufficiently in a high level at the time of the supporting thereof.

Moreover, when the thickness of the sealing material layer is about 2 mm or less, the pressure loss can be controlled.

Furthermore, after a heating treatment as described later, the coefficient $\alpha_L$ of thermal expansion of the sealing material layer is here adjusted such that the coefficient $\alpha_L$ of thermal expansion of the sealing material layer and the coefficient $\alpha_F$ of thermal expansion of the honeycomb unit satisfy the following relationship:

$$\text{about } 0.01 \leq |\alpha_L - \alpha_F|/\alpha_F \leq \text{about } 1.0.$$

The number of honeycomb units to be bonded to one another may be appropriately determined in accordance with the size of the resulting honeycomb structured body. Here, according to need, a honeycomb unit united body in which honeycomb units are bonded to one another through the sealing material layers is appropriately cut and subjected to a polishing process and the like, such that ceramic blocks are prepared.

Next, according to need, a coating material paste is applied to the peripheral face of the ceramic block, and dried and secured thereto to form a coating material layer.

By forming the coating material layer thereon, the peripheral face of the ceramic block can be protected, and thus the strength of the honeycomb structured body can be enhanced.

Moreover, in this case, after a heating treatment as described later, it is desirable that the coefficient $\alpha_M$ of thermal expansion of the coating material layer is adjusted such that the coefficient $\alpha_M$ of thermal expansion of the coating material layer and the coefficient $\alpha_F$ of thermal expansion of the honeycomb unit satisfy the following relationship:

$$\text{about } 0.01 \leq |\alpha_M - \alpha_F|/\alpha_F \leq \text{about } 1.0.$$

The coating material paste is not particularly limited, and may be made of the same material as the sealing material paste, or may be made of a different material therefrom.

Moreover, when the coating material paste is made of the same material as the sealing material paste, the compounding ratios of constituent components of the two pastes may be the same or may be different from each other.

Although the thickness of the coating material layer is not particularly limited, it is desirable to be at least about 0.1 mm and at most about 2 mm.

When the thickness is at least about 0.1 mm and at most about 2 mm, strength of the honeycomb structured body sufficient for protecting the outer circumferential face can be obtained, and furthermore, reduction of the specific surface area per unit volume of the honeycomb structured body can be controlled, making a catalyst component to disperse sufficiently in a high level upon the supporting thereof.

In this manufacturing method, it is desirable that, after plural honeycomb units have been bonded to one another through sealing material layers (when a coating material layer is provided, after the coating material layer has been formed), calcination is carried out.

An organic binder contained in the sealing material layer and the coating material layer can thereby be degreased, leading to removal thereof.

The conditions of the calcination is determined appropriately in accordance with the kinds and amounts of organic substances to be contained therein, and it is desirable therefor to be at about 700° C. for about 2 hours.

Here, as one example of the honeycomb structured body, referring to FIG. 1B, description for a honeycomb structured body in which plural honeycomb units are bonded to one another into a cylindrical contour, each unit having a rectangular parallelepiped shape with a square cross section, will be given.

The honeycomb structured body 10 is prepared by the following processes: honeycomb units 11 are bonded to one another through sealing material layers 14, and after having been cut into a cylindrical shape, the peripheral face of the ceramic block of which cells 12 are not formed is covered with a coating material layer 16.

Moreover, in the above-mentioned manufacturing method, a honeycomb structured body having a predetermined shape (for example, a cylindrical shape as in FIG. 1B) may be manufactured by forming honeycomb units having a cross section with a sector shape or honeycomb units having a cross section with a square shape preliminarily, and bonding them to one another through sealing material layers.

In this case, cutting and polishing processes can be omitted.

Although the use of such honeycomb structured body of the present invention is not particularly limited, it can be suitably used as a catalyst support for exhaust gas conversion of a vehicle.

When used as a catalyst support for exhaust gas conversion of a diesel engine, the honeycomb structured body is sometimes used together with a diesel particulate filter (DPF) that has a ceramic honeycomb structure made of silicon carbide and the like and also has a function of filtering and burning particulate matters (PMs) in exhaust gases, and in such a case, the positional relationship between the honeycomb structured body of the present invention and the DPF may be such that the honeycomb structured body of the present invention is placed on either the front side (close side to the engine) or the rear side (far side to the engine) of the DPF.

When placed on the front side (close side), heat generated through the reaction of the honeycomb structured body of the present invention is transmitted to the DPF on the rear side (far side), and the temperature raising process at the time of regeneration of the DPF can be accelerated.

In contrast, when placed on the rear side (far side), PMs in exhaust gases are filtered through the DPF, and pass through the cells of the honeycomb structured body of the present invention thereafter; therefore, clogging hardly occurs, and gas components generated through incomplete combustion upon burning PMs in the DPF, are also processed by using the honeycomb structured body of the present invention.

Here, the honeycomb structured body can of course be utilized for the purposes and the like described in the aforementioned Background Art, and may also be utilized without being particularly limited. As one example thereof, the honeycomb structured body can be used for purposes in which no catalyst component is supported thereon (for example, adsorbent that adsorbs gaseous components and liquid components, and the like).

Moreover, a catalyst may be supported on the honeycomb structured body so that it can be used as a honeycomb catalyst.

Although examples of the catalyst are not particularly limited, they include, for example, noble metal, alkali metal, alkaline earth metal, oxides and the like.

These materials may be used independently, or two or more kinds of these may be used in combination.

Examples of the above-mentioned noble metal include platinum, palladium, rhodium and the like. Examples of the alkali metal include potassium, sodium and the like. Examples of the alkaline earth metal include barium and the like. Examples of the oxide include perovskite (such as $La_{0.75}K_{0.25}MnO_3$), $CeO_2$ and the like.

Although not particularly limited, the above-mentioned honeycomb structured body (honeycomb catalyst) on which a catalyst is supported is used as so-called three-way catalyst and NOx-occlusion catalyst, used for exhaust gas conversion of a vehicle.

Here, the timing in which the catalyst is supported is not particularly limited, and the supporting process may be carried out after the honeycomb structured body has been manufactured or on ceramic particles serving as the raw material.

Moreover, the supporting method of the catalyst is not particularly limited, and for example, an impregnation method and the like may be used.

EXAMPLES

Hereinafter, description for the present invention will be given in detail by means of examples; however, the present invention is not intended to be limited by these examples.

Preparation of Paste D

29% by weight of γ-Alumina particles (average particle diameter: 2 μm), 7% by weight of silica-alumina fibers (average fiber diameter: 10 μm, average fiber length: 100 μm), 34% by weight of silica sol (solid concentration: 30% by weight), 5% by weight of carboxymethyl cellulose (CMC) and 25% by weight of water were mixed to prepare a paste D.

The coefficient of thermal expansion (at 800° C.) of the paste D after having been cured is $6.00 \times 10^{-6}$ (1/K).

Preparation of Pastes A, B, C, E and F

Each of the pastes were prepared through the same processes as those of the paste D, except that compounds and blending amounts were changed as indicated in Table 1.

Table 1 also shows coefficient of thermal expansions (at 800° C.) of each of the pastes.

TABLE 1

| | Paste | | | | | |
| --- | --- | --- | --- | --- | --- | --- |
| | A | B | C | D | E | F |
| γ-alumina particles (average particle diameter: 2 μm) | — | — | — | 29 | 29 | 29 |
| Silica particles (average particle diameter: 2 μm) | — | — | 29 | — | — | — |
| SiC particles (average particle diameter: 0.5 μm) | 29 | 29 | — | — | — | — |
| Silica-alumina fibers (average fiber diameter: 10 μm; average fiber | 7 | — | 7 | 7 | 7 | — |

TABLE 1-continued

| | Paste | | | | | |
|---|---|---|---|---|---|---|
| | A | B | C | D | E | F |
| length: 100 μm) | | | | | | |
| Alumina fibers (average fiber diameter: 10 μm; average fiber length: 100 μm) | — | 7 | — | — | — | 7 |
| Silica sol (solid concentration: 30% by weight) | 34 | 34 | 34 | 34 | — | — |
| Alumina sol (solid concentration: 30% by weight) | — | — | — | — | 34 | 34 |
| CMC | 5 | 5 | 5 | 5 | 5 | 5 |
| Water | 25 | 25 | 25 | 25 | 25 | 25 |
| Coefficient of thermal expansion (at 800° C.) (×10$^{-6}$(1/K) | 3.8 | 3.85 | 3.0 | 6.0 | 7.6 | 7.8 |

(Note)
The unit of each blending amount is % by weight.

Example 1

(1) 40% by weight of γ-alumina particles (average particle diameter: 2 μm), 10% by weight of silica-alumina fibers (average fiber diameter: 10 μm, average fiber length: 100 μm, aspect ratio: 10) and 50% by weight of silica sol (solid concentration: 30% by weight) were mixed, and to 100 parts by weight of the resulting mixture were added 6 parts by weight of methylcellulose serving as an organic binder and a slight amount of a plasticizer and a lubricant, and the mixture was further mixed and kneaded to obtain a mixed composition. This mixed composition was extrusion-molded by using an extrusion molding machine, so that a raw molded product was obtained.

(2) Next, the above-mentioned raw molded product was sufficiently dried by using a micro-wave dryer and a hot-air dryer, and further maintained at 400° C. for 2 hours to be degreased.

Thereafter, this was maintained at 800° C. for 2 hours to be fired, so that a honeycomb unit 11, which had a rectangular pillar shape (34.3 mm×34.3 mm×150 mm), a cell density of 93 cells/cm$^2$ (600 cpsi) and a cell wall of 0.2 mm in thickness, with the cross-sectional shape of the cell being formed into a quadrangular shape (square), was obtained.

Figure 2:
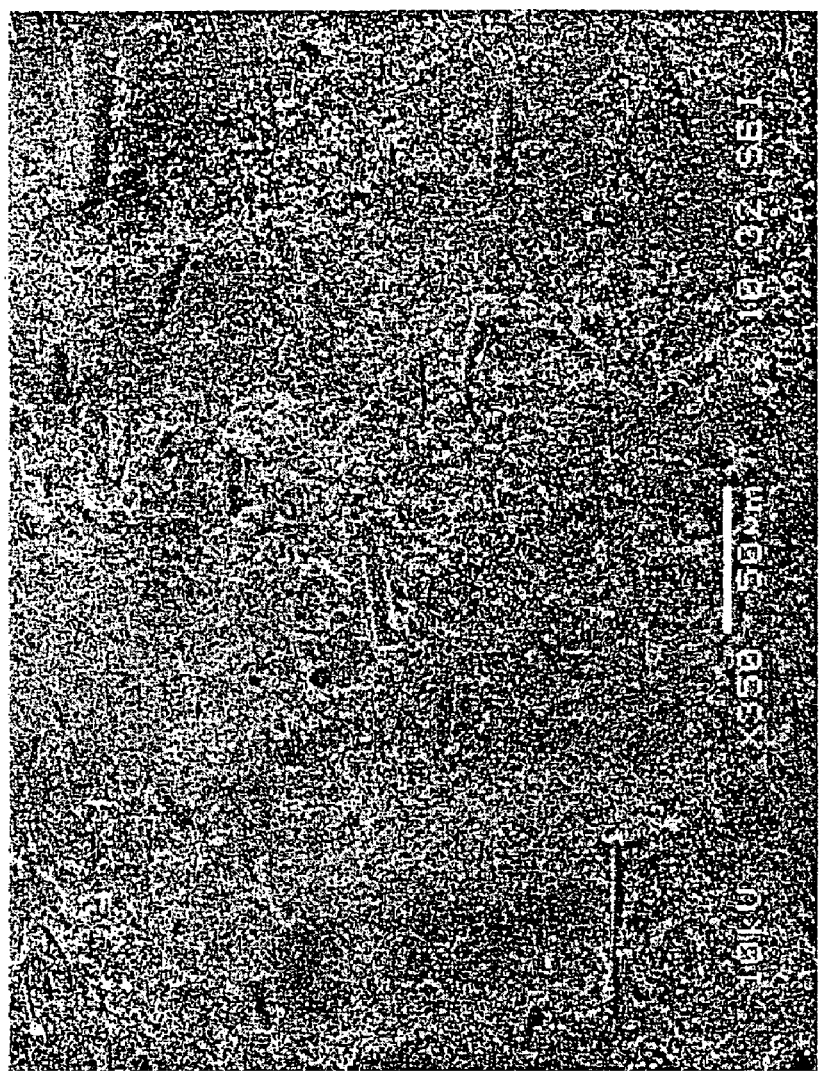
FIG. 2 is a scanning electron microscopic (SEM) photograph that shows cell walls of a honeycomb unit in accordance with Example 1.

FIG. 2 shows a scanning electron microscope (SEM) photograph of the wall face of this honeycomb unit 11.

This photograph indicates that in the honeycomb unit 11, the silica-alumina fibers are oriented along the extrusion direction of the raw material paste.

Moreover, the coefficient $\alpha_F$ of thermal expansion (at 800° C.) of the honeycomb unit manufactured through these processes was 3.8×10$^{-6}$ (1/K).

(3) Next, plural honeycomb units 11 were bonded to one another by using the above-mentioned paste D as a sealing material paste, so that a ceramic block was prepared.

Figure 3A:
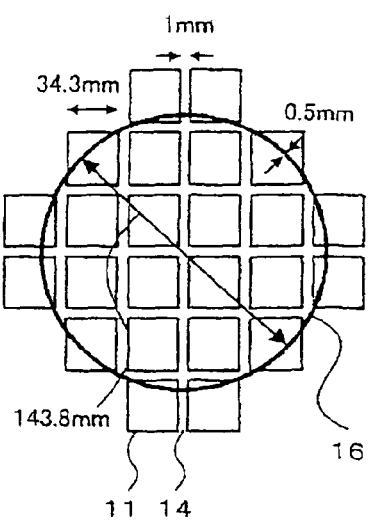
FIGS. 3A to 3C are explanatory views that indicate experimental examples in which plural honeycomb units are bonded to one another.

FIG. 3A shows a ceramic block having the plural honeycomb units 11 bonded to one another, which is viewed from a face having cells (hereinafter, defined as the front face).

This ceramic block has a structure in which a sealing material paste (paste D) is applied to the outer face 13 of the honeycomb unit 11 so as to form a sealing material layer 14 of 1 mm in thickness, and the plural honeycomb units 11 were bonded to one another and secured thereafter.

(4) After such a ceramic block had been fabricated, this ceramic block was cut into a column shape by using a diamond cutter so that the front face of the ceramic block had an almost point-symmetric pattern; thereafter, the above-mentioned paste D was applied as the coating material paste onto the outer surface of the circle (peripheral face of the ceramic block) in which cells are not formed, such that it is 0.5 mm in thickness, and thus the outer surface was coated.

(5) Next, a honeycomb structured body 10 having a cylindrical shape (143.8 mm in diameter×150 mm in height) was obtained by drying at 120° C., and maintaining at 700° C. for 2 hours, so that the sealing material paste and the coating material paste were degreased.

With respect to the honeycomb structured body manufactured in this example, Table 2 shown below collectively shows various numeric values concerning the cross-sectional shape of the honeycomb unit, the cross-sectional area of the honeycomb unit and the cross-sectional occupied ratio of the honeycomb unit (the ratio of the total sum of the cross-sectional areas of the honeycomb units in the cross-sectional area of the honeycomb structured body).

Table 2 also shows the value of $|\alpha_L-\alpha_F|/\alpha_F$ and the value of $|\alpha_M-\alpha_F|/\alpha_F$ of the honeycomb structured body manufactured in this example.

Here, Table 2 also shows numeric values of each of the other examples and comparative examples.

Examples 2, 3

A honeycomb structured body was manufactured through the same processes as Example 1, except that the shape of the honeycomb unit was as shown in Table 2.

Figure 3B:
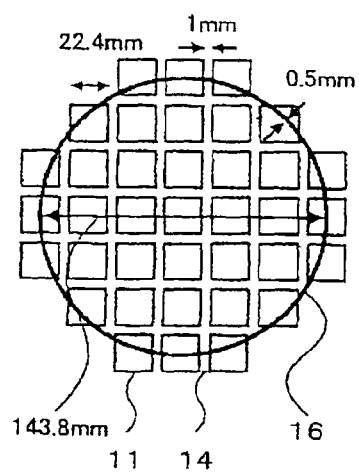
Figure 3C:
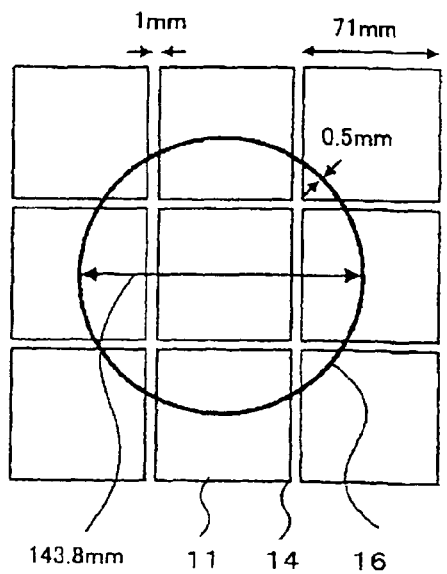

Here, FIGS. 3B and 3C show schematic diagrams viewed from the front side of ceramic blocks according to Examples 2 and 3, respectively.

Example 4

A honeycomb structured body was manufactured through the same processes as Example 1, except that the above-mentioned paste B was used as the sealing material paste and coating material paste.

Example 5

A honeycomb structured body was manufactured through the same processes as Example 1, except that the above-mentioned paste C was used as the sealing material paste and coating material paste.

Example 6

A honeycomb structured body was manufactured through the same processes as Example 1, except that the above-mentioned paste E was used as the sealing material paste and coating material paste.

Example 7

A honeycomb structured body was manufactured through the same processes as Example 1, except that the above-mentioned paste D was used as the sealing material paste and that the above-mentioned paste A was used as the coating material paste.

Example 8

A honeycomb structured body was manufactured through the same processes as Example 1 were carried out except that the above-mentioned paste D was used as the sealing material paste and that the above-mentioned paste F was used as the coating material paste.

Comparative Examples 1, 2

A honeycomb structured body was manufactured through the same processes as Example 1, except that the shape of the honeycomb unit was as shown in Table 2.

Figure 4A:
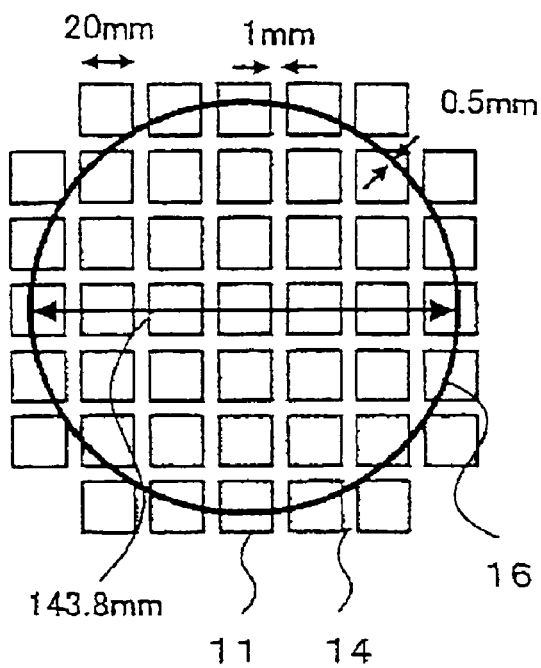
FIGS. 4A and 4B are explanatory views that indicate comparative examples in which plural honeycomb units are bonded to one another.
Figure 4B:
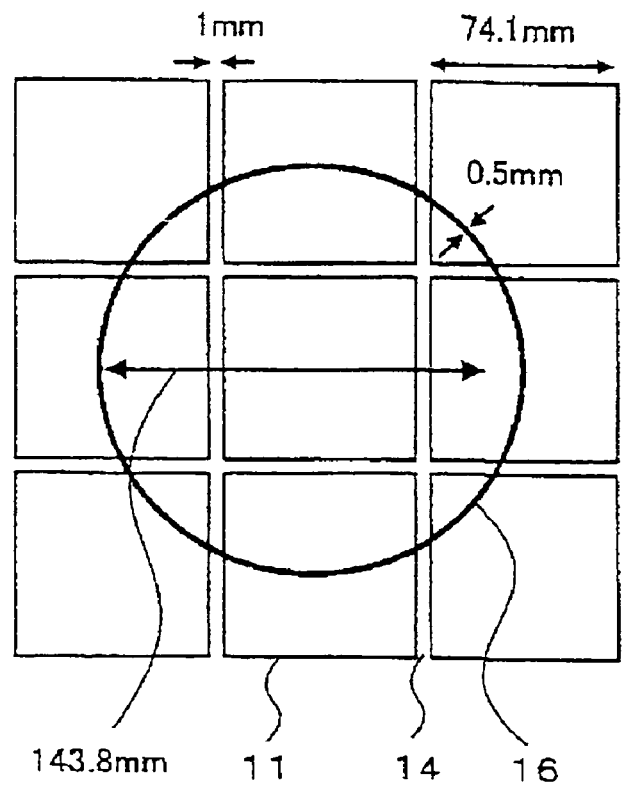

Here, FIGS. 4A and 4B show schematic diagrams viewed from the front side of ceramic blocks according to Comparative Examples 1 and 2, respectively.

Comparative Example 3

A honeycomb structured body was manufactured through the same processes as Example 1, except that the above-mentioned paste A was used as the sealing material paste and coating material paste.

Comparative Example 4

A honeycomb structured body was manufactured through the same processes as Example 1, except that the above-mentioned paste F was used as the sealing material paste and coating material paste.

the specific surface area of the honeycomb structured body refers to a specific surface area per apparent volume of the honeycomb structured body.

$$S(m^2/L) = (A/100) \times B \times C \quad (1)$$

The contents of JIS-R-1626 (1996) are incorporated herein by reference in their entirety.

[Thermal Shock/Vibration Repetitive Test]

Figure 5A:
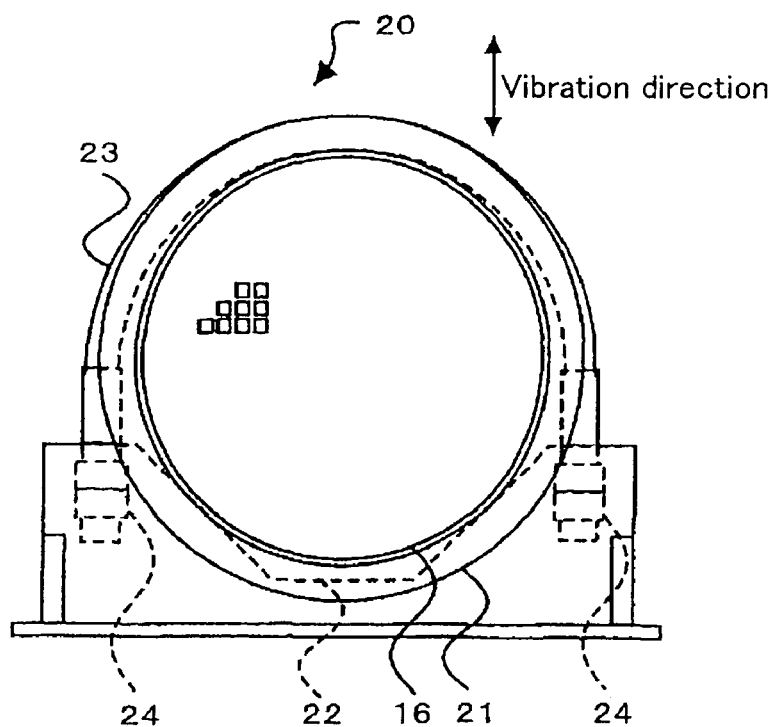
FIG. 5A is a front view of a vibration device used for a vibration test.
Figure 5B:
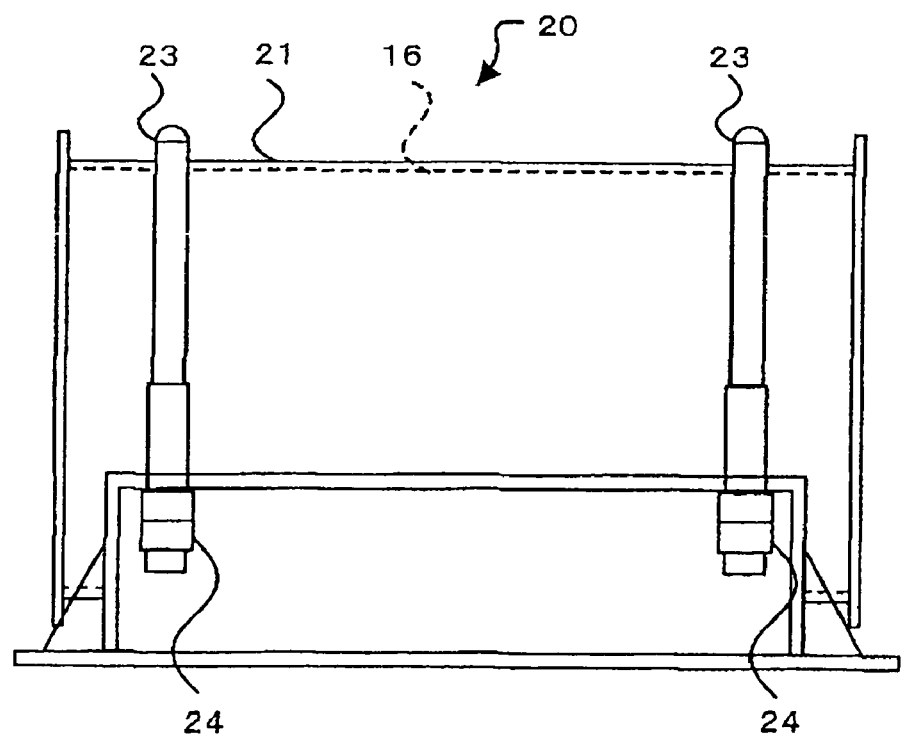
FIG. 5B is a side view of the vibration device.

In a thermal shock test, a honeycomb structured body, being kept in a metal casing 21, with an alumina mat (MAFTEC, 46.5 cm×15 cm, thickness 6 mm, made by Mitsubishi Chemical Corp.), which is a heat-insulating material made of alumina fibers, wound around the peripheral face thereof was put into a firing furnace set at 600° C., and was heated for 10 minutes, and then taken out from the firing furnace and quenched to room temperature. Next, a vibration test was carried out by keeping the honeycomb structured body in this metal casing. FIG. 5A is a front view that shows a vibration testing device 20 used for the vibration test, and FIG. 5B is a side view that shows the vibration testing device 20. The metal casing 21 which held the honeycomb structured body therein was placed on a mount 22, and the metal casing 21 was secured thereon by tightening a securing member 23 having an almost U-shape with a screw 24. Thus, the metal casing 21 was allowed to vibrate with the mount 22 and the securing member 23, being integrally held together therewith. The

TABLE 2

| | Honeycomb unit | | | Sealing material layer | | | Coating layer | | |
|---|---|---|---|---|---|---|---|---|---|
| | Cross-sectional shape | Cross-sectional area | Cross-sectional occupied ratio | Thickness | Paste | $|\alpha_L - \alpha_F|/\alpha_F$ | Thickness | Paste | $|\alpha_M - \alpha_F|/\alpha_F$ |
| Example 1 | 3.43 cm square | 11.8 cm² | 93.5% | 1 mm | D | 0.579 | 0.5 mm | D | 0.579 |
| Example 2 | 2.24 cm square | 5.0 cm² | 90.2% | 1 mm | D | 0.579 | 0.5 mm | D | 0.579 |
| Example 3 | 7.10 cm square | 50.0 cm² | 95.5% | 1 mm | D | 0.579 | 0.5 mm | D | 0.579 |
| Example 4 | 3.43 cm square | 11.8 cm² | 93.5% | 1 mm | B | 0.013 | 0.5 mm | B | 0.013 |
| Example 5 | 3.43 cm square | 11.8 cm² | 93.5% | 1 mm | C | 0.211 | 0.5 mm | C | 0.211 |
| Example 6 | 3.43 cm square | 11.8 cm² | 93.5% | 1 mm | E | 1.000 | 0.5 mm | E | 1.000 |
| Example 7 | 3.43 cm square | 11.8 cm² | 93.5% | 1 mm | D | 0.579 | 0.5 mm | A | 0 |
| Example 8 | 3.43 cm square | 11.8 cm² | 93.5% | 1 mm | D | 0.579 | 0.5 mm | F | 1.053 |
| Comparative Example 1 | 2.00 cm square | 4.0 cm² | 89.7% | 1 mm | D | 0.579 | 0.5 mm | D | 0.579 |
| Comparative Example 2 | 7.41 cm square | 55.0 cm² | 95.6% | 1 mm | D | 0.579 | 0.5 mm | D | 0.579 |
| Comparative Example 3 | 3.43 cm square | 11.8 cm² | 93.5% | 1 mm | A | 0 | 0.5 mm | A | 0 |
| Comparative Example 4 | 3.43 cm square | 11.8 cm² | 93.5% | 1 mm | F | 1.053 | 0.5 mm | F | 1.053 |

(Evaluation)

Characteristics of the honeycomb structured bodies thus manufactured were measured through the following methods.

[Measurements on Specific Surface Area]

First, volumes of honeycomb units and sealing material layers were actually measured, and a ratio A (vol %) of the honeycomb units in the volume of the honeycomb structured body was calculated. Next, a BET specific surface area B (m²/g) per unit weight of the honeycomb unit was measured. The BET specific surface area was measured through a one-point method in compliance with JIS-R-1626 (1996) defined by Japanese Industrial Standard, by using a BET measuring device (Micromeritics FlowSorb II-2300, made by Shimadzu Corp.). Upon measuring, samples prepared by cutting out cylindrical-shaped small pieces (15 mm in diameter×15 mm in height) were used. Then, the apparent density C (g/L) of the honeycomb unit was calculated through the weight and the volume decided by the shape of the honeycomb units, and the specific surface area S (m²/L) of the honeycomb structured body was calculated from the following expression (1). Here, vibration test was carried out under conditions of a frequency of 160 Hz, an acceleration of 30 G, an amplitude of 0.58 mm and a retention time of 10 hr, at room temperature, and in a vibration direction of the Z-axis direction (up and down). 10 times each of these thermal shock test and vibration test were repeated alternately, and the weight T0 before the tests and the weight Ti after the tests were measured, and the weight reduction ratio G was calculated by using the following expression (2).

$$G(\text{wt \%}) 100 \times (T0 - Ti)/T0 \quad (2)$$

[Pressure Loss Measurement]

Figure 6:
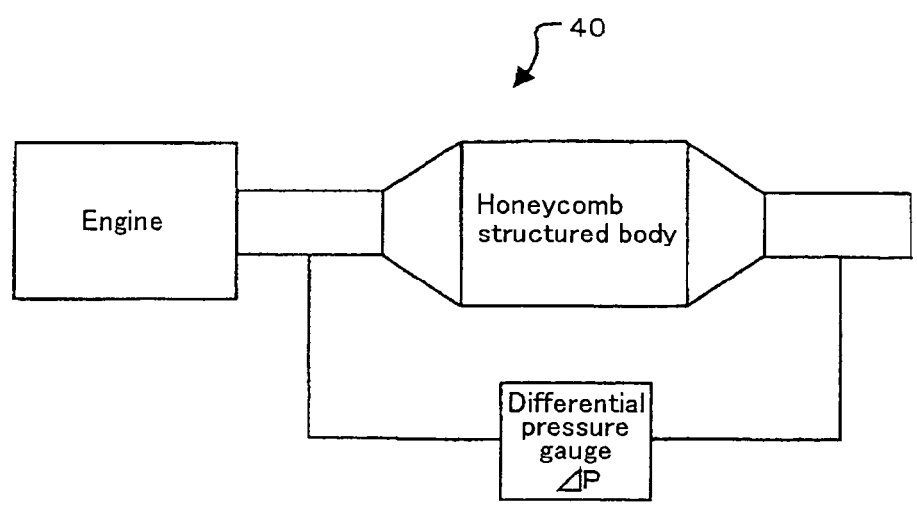
FIG. 6 is a schematic diagram that shows a pressure-loss measuring device.

A pressure-loss measuring device 40 is shown in FIG. 6. In this measuring method, a honeycomb structured body with an alumina mat being wound thereon, which was put into a metal casing, was placed in an exhaust pipe of a common rail-type diesel engine of 2 L, and pressure meters were attached to front and rear sides of the honeycomb structured body. With respect to the measuring conditions, the engine revolution was set to 1500 rpm and the torque was set to 50 Nm, and a differential pressure after a lapse of 5 minutes from the start up was measured.

TABLE 3

| | Specific surface area (m²/L) | | Reduction ratio G (wt %) | |
|---|---|---|---|---|
| | Honeycomb unit | Honeycomb structured body | after thermal shock/vibration tests | Pressure loss (kPa) |
| Example 1 | 42000 | 39270 | 0 | 2.4 |
| Example 2 | 42000 | 37884 | 0 | 2.5 |
| Example 3 | 42000 | 40110 | 3 | 2.3 |
| Example 4 | 42000 | 39270 | 3 | 2.4 |
| Example 5 | 42000 | 39270 | 0 | 2.4 |
| Example 6 | 42000 | 39270 | 4 | 2.4 |
| Example 7 | 42000 | 39270 | 6 | 2.4 |
| Example 8 | 42000 | 39270 | 9 | 2.4 |
| Comparative Example 1 | 42000 | 37674 | 0 | 2.8 |
| Comparative Example 2 | 42000 | 40152 | 52 | 2.3 |
| Comparative Example 3 | 42000 | 39270 | 24 | 2.4 |
| Comparative Example 4 | 42000 | 39270 | 32 | 2.4 |

As clearly indicated by the above-mentioned test results, in the honeycomb structured bodies according to Examples 1 to 6, the weight reduction ratio G in the thermal shock/vibration tests was 0 to 4% by weight, which indicates that the honeycomb structured bodies were highly resistant to thermal shock and vibration, and superior in durability.

In contrast, in the honeycomb structured body according to Comparative Example 1, although the weight reduction ratio G in the thermal shock/vibration tests was small, the pressure loss was greater in comparison with the honeycomb structured bodies according to the Examples. This is presumably because, since the cross-sectional area of the honeycomb unit is small, the cross-sectional occupied ratio of the honeycomb units becomes inevitably smaller, and consequently a high pressure loss is caused. Moreover, in the honeycomb structured bodies according to Comparative Examples 2 to 4, the weight reduction ratio G in the thermal shock/vibration tests was greater meaning that there is degradation in the strength and durability. The reason for this is presumably because the cross-sectional area of the honeycomb unit is not in the range of 5.0 to 50.0 cm² (Comparative Examples 1, 2) and because the relationship, $0.01 \leq |\alpha_L - \alpha_F|/\alpha_F \leq 1.0$, is not satisfied (Comparative Examples 3, 4).

Additionally, in the honeycomb structured bodies according to Examples 7 and 8, the weight reduction ratio G in the thermal shock/vibration tests was slightly inferior to those honeycomb structured bodies of Examples 1 to 6, although it was within a permissible range. This is presumably because, in the honeycomb structured bodies according to Examples 7 and 8, although coefficient $\alpha_L$ of thermal expansion of the sealing material layer and coefficient $\alpha_F$ of thermal expansion of the honeycomb unit satisfy the relationship, $0.01 \leq |\alpha_L - \alpha_F|/\alpha_F \leq 1.0$, coefficient $\alpha_M$ of thermal expansion of the coating layer and coefficient $\alpha_F$ of thermal expansion of the honeycomb unit fails to satisfy the relationship, $0.01 \leq |\alpha_M - \alpha_F|/\alpha_F \leq 1.0$. These results indicate that it is desirable for coefficient $\alpha_M$ of thermal expansion of the coating layer and coefficient $\alpha_F$ of thermal expansion of the honeycomb unit to satisfy the relationship, $0.01 \leq |\alpha_M - \alpha_F|/\alpha_F \leq 1.0$.

Moreover, each of the honeycomb structured bodies according to the Examples had a high specific surface area.

What is claimed as new and desired to be secured by Letters Patent of the United States is:

1. A honeycomb structured body in which plural pillar-shaped honeycomb units are bonded to one another through sealing material layers, each honeycomb unit having in a longitudinal direction a large number of cells placed in parallel with a cell wall therebetween, all of the cells being open on an end face of the honeycomb unit, wherein each of said honeycomb unit includes inorganic fibers and/or whiskers in addition to inorganic particles, and the inorganic fibers and/or whiskers increase a specific surface area of the honeycomb unit, a cross-sectional area of said honeycomb unit on a cross section perpendicular to the longitudinal direction ranges from about 5 cm² to about 50 cm², said inorganic particles comprise at least one member chosen from alumina, silica, zirconia, titania, ceria, mullite, and zeolite, said honeycomb unit is produced by firing materials including said inorganic fibers and/or whiskers and said inorganic particles at a temperature ranging from 600° C. and 1200° C., a specific surface area per unit volume of the honeycomb structured body ranges from 37,884 m²/L to 40, 110 m²/L, and a coefficient $\alpha_L$ of thermal expansion of said sealing material layers and a coefficient $\alpha_F$ of thermal expansion of said honeycomb unit have the following relationship:

about $0.01 \leq |\alpha_L - \alpha_F|/\alpha_F \leq$ about 1.0.

2. The honeycomb structured body according to claim 1, wherein the total sum of cross-sectional areas of said honeycomb units on the cross section perpendicular to the longitudinal direction accounts for about 85% or more of the cross-sectional area of said honeycomb structured body on the cross section perpendicular to the longitudinal direction.

3. The honeycomb structured body according to claim 1, wherein the total sum of cross-sectional areas of said honeycomb units on the cross section perpendicular to the longitudinal direction accounts for about 90% or more of the cross-sectional area of said honeycomb structured body on the cross section perpendicular to the longitudinal direction.

4. The honeycomb structured body according to claim 1, wherein a coating material layer is formed on the outermost periphery, and a coefficient $\alpha_m$ of thermal expansion of said coating material layer and the coefficient $\alpha_F$ of thermal expansion of said honeycomb unit have the following relationship:

about $0.01 \leq |\alpha_M - \alpha_F|/\alpha_F \leq$ about 1.0.

5. The honeycomb structured body according to claim 1, wherein the amount of said inorganic particle contained in said honeycomb unit is at least about 30% by weight and at most about 97% by weight.

6. The honeycomb structured body according to claim 5, wherein the amount of said inorganic particle contained in said honeycomb unit is at least about 40% by weight and at most about 90% by weight.

7. The honeycomb structured body according to claim 5, wherein the amount of said inorganic particle contained in said honeycomb unit is at least about 50% by weight and at most about 80% by weight.

8. The honeycomb structured body according to claim 1, wherein said inorganic fibers and/or whiskers comprise of at least one member selected from the group consisting of alumina, silica, silicon carbide, silica-alumina, glass, potassium titanate and aluminum borate.

9. The honeycomb structured body according to claim 1, wherein the aspect ratio (length/diameter) of said inorganic fibers and/or whiskers is at least about 2 and at most about 1000.

10. The honeycomb structured body according to claim 9, wherein the aspect ratio (length/diameter) of said inorganic fibers and/or whiskers is at least about 5 and at most about 800.

11. The honeycomb structured body according to claim 9, wherein the aspect ratio (length/diameter) of said inorganic fibers and/or whiskers is at least about 10 and at most about 500.

12. The honeycomb structured body according to claim 1, wherein the total amount of said inorganic fibers and/or whiskers contained in said honeycomb unit is at least about 3% by weight and at most about 70% by weight.

13. The honeycomb structured body according to claim 12, wherein the total amount of said inorganic fibers and/or whiskers contained in said honeycomb unit is at least about 5% by weight and at most about 50% by weight.

14. The honeycomb structured body according to claim 12, wherein the total amount of said inorganic fiber and/or whiskers contained in said honeycomb unit is at least about 8% by weight and at most about 40% by weight.

15. The honeycomb structured body according to claim 1, wherein said honeycomb unit further contains an inorganic binder.

16. The honeycomb structured body according to claim 15, wherein the amount of said inorganic binder as solid component of a raw material paste is at least about 5% by weight and at most about 50% by weight.

17. The honeycomb structured body according to claim 16, wherein the amount of said inorganic binder as solid component of a raw material paste is at least about 10% by weight and at most about 40% by weight.

18. The honeycomb structured body according to claim 16, wherein the amount of said inorganic binder as solid component of a raw material paste is at least about 15% by weight and at most about 35% by weight.

19. The honeycomb structured body according to claim 15, wherein said inorganic binder comprises of at least one member selected from the group consisting of alumina sol, silica sol, titania sol, water glass, sepiolite and attapulgite.

20. The honeycomb structured body according to claim 1, on which a catalyst is supported.

21. The honeycomb structured body according to claim 20, wherein said catalyst contains at least one member selected from the group consisting of noble metal, alkali metal, alkaline earth metal and oxide.

22. The honeycomb structured body according to claim 1, which is used for exhaust gas conversion of a vehicle.

23. A method of manufacturing a honeycomb structured body in which plural pillar-shaped honeycomb units are bonded to one another through sealing material layers, each honeycomb unit having in a longitudinal direction a large number of cells placed in parallel with a cell wall therebetween, all of the cells being open on an end face of the honeycomb unit, wherein each of said honeycomb unit includes inorganic fibers and/or whiskers in addition to inorganic particles, and the inorganic fivers and/or whiskers increase a specific surface area of the honeycomb unit, a cross-sectional area of said honeycomb unit on a cross section perpendicular to the longitudinal direction ranges from about 5 cm² to about 50 cm², said inorganic particles comprise at least one member chosen from alumina, silica, zirconia, titania, ceria, mullite, and zeolite, said honeycomb unit is produced by firing materials including said inorganic fibers and/or whiskers and said inorganic particles at a temperature ranging from 600° C. to 1200° C., a specific surface area per unit volume of the honeycomb structured body ranges from 37,884 m²/L to 40,110 m²/L, and a coefficient $\alpha_L$ of thermal expansion of said sealing material layers and a coefficient $\alpha_L$ of thermal expansion of said honeycomb unit having the following relationship:

about $0.01 \leq |\alpha_L - \alpha_F|/\alpha_F \leq$ about $1.0$

, the method comprising:

obtaining a plurality of pillar-shaped honeycomb units, each of the plurality of honeycomb units having a coefficient of thermal expansion $\alpha_L$;

obtaining a sealing material, the sealing material having a coefficient of thermal expansion $\alpha_F$ such that about $0.01 \leq |\alpha_L - \alpha_F|/\alpha_F \leq$ about $1.0$;

binding the plurality of pillar-shaped honeycomb units together by interposing between adjacent honeycomb units layers of said sealing material.

* * * * *

UNITED STATES PATENT AND TRADEMARK OFFICE
CERTIFICATE OF CORRECTION

PATENT NO. : 7,981,496 B2
APPLICATION NO. : 11/298833
DATED : July 19, 2011
INVENTOR(S) : Kazushige Ohno, Masafumi Kunieda and Kazutake Ogyu It is certified that error appears in the above-identified patent and that said Letters Patent is hereby corrected as shown below:

On the Title Page, Item (73), in the "Assignee", "Ltd," should be --Ltd., --.

In claim 1, col. 18, line 20, "40, 110" should read --40,110--.

In claim 23, col. 20, lines 30-32,

"about $0.01 \leq |\alpha_L - \alpha_F|/\alpha_F \leq$ about 1.0

, the method comprising:"

should read

--about $0.01 \leq |\alpha_L - \alpha_F|/\alpha_F \leq$ about 1.0, the method comprising:--.

Signed and Sealed this
Eleventh Day of October, 2011

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,981,496 B2 | Page 1 of 1 |
| APPLICATION NO. | : 11/298833 | |
| DATED | : July 19, 2011 | |
| INVENTOR(S) | : Kazushige Ohno, Masafumi Kunieda and Kazutake Ogyu | |

It is certified that error appears in the above-identified patent and that said Letters Patent is hereby corrected as shown below:

In Claim 4, col. 18, line 3, "$\alpha_m$" should read --$\alpha_M$--.

In Claim 23, col. 20, line 10, "fivers" should read --fibers--.

In Claim 23, col. 20, line 26, "$\alpha_L$" should read --$\alpha_F$--.

In Claim 23, col. 20, lines 28 and 29,

"about 1.0
, the method comprising:"

should read

--about 1.0,
the method comprising:--.

In Claim 23, col. 20, line 32, "$\alpha_L$" should read --$\alpha_F$--.

In Claim 23, col. 20, line 34, "$\alpha_F$" should read --$\alpha_L$--.

Signed and Sealed this
Twentieth Day of December, 2011

David J. Kappos
*Director of the United States Patent and Trademark Office*